(12) United States Patent
Tsai

(10) Patent No.: US 7,614,664 B1
(45) Date of Patent: Nov. 10, 2009

(54) FAST-CONNECTING JOINT FOR CORRUGATED PIPES

(75) Inventor: Tzu-Liang Tsai, Kao Hsiung County (TW)

(73) Assignee: Yea Der Lih Enterprise Co., Ltd., Kao Hsiung County (TW)

( * ) Notice: Subject to any disclaimer, the term of this patent is extended or adjusted under 35 U.S.C. 154(b) by 0 days.

(21) Appl. No.: 12/104,198

(22) Filed: Apr. 16, 2008

(51) Int. Cl.
*F16L 37/00* (2006.01)

(52) U.S. Cl. .................................. 285/319; 285/903

(58) Field of Classification Search ............... 285/319, 285/901, 903
See application file for complete search history.

(56) References Cited

U.S. PATENT DOCUMENTS

| | | | | |
|---|---|---|---|---|
| 1,702,878 | A * | 2/1929 | Mersfelder et al. | 220/287 |
| 3,603,621 | A * | 9/1971 | Parsons | 285/319 |
| 4,261,386 | A * | 4/1981 | Young | 137/467 |
| 4,696,497 | A * | 9/1987 | Schwarzensteiner | 285/307 |
| 4,836,580 | A * | 6/1989 | Farrell | 285/24 |
| 4,848,458 | A * | 7/1989 | Holdsworth et al. | 166/92.1 |
| 4,905,964 | A * | 3/1990 | Shiozaki | 251/149.6 |
| 4,919,462 | A * | 4/1990 | Matsui et al. | 285/149.1 |
| 4,948,176 | A * | 8/1990 | Bartholomew | 285/93 |
| 4,989,905 | A * | 2/1991 | Rajecki | 285/319 |
| 5,048,875 | A * | 9/1991 | Usui et al. | 285/319 |
| 5,112,086 | A * | 5/1992 | Gruber et al. | 285/86 |
| 5,716,081 | A * | 2/1998 | Leigh-Monstevens et al. | 285/319 |
| 6,092,274 | A * | 7/2000 | Foti | 29/520 |
| 6,199,913 | B1 * | 3/2001 | Wang | 285/24 |
| 6,199,918 | B1 * | 3/2001 | Gerich | 285/308 |
| 6,199,920 | B1 * | 3/2001 | Neustadtl | 285/322 |
| 6,237,969 | B1 * | 5/2001 | Amatsutsu | 285/357 |
| 6,254,145 | B1 * | 7/2001 | Schwarz et al. | 285/319 |
| 6,260,584 | B1 * | 7/2001 | Foti | 138/109 |
| 6,267,416 | B1 * | 7/2001 | Ferreira et al. | 285/319 |
| 6,428,052 | B1 * | 8/2002 | Albino et al. | 285/23 |
| 6,447,024 | B1 * | 9/2002 | Olson | 285/319 |
| 6,502,866 | B1 * | 1/2003 | Hujisawa et al. | 285/249 |
| 6,733,046 | B1 * | 5/2004 | Rief | 285/276 |
| 6,908,114 | B2 * | 6/2005 | Moner | 285/23 |
| 7,055,868 | B2 * | 6/2006 | Watanabe | 285/249 |
| 2001/0008342 | A1 * | 7/2001 | Kikumori et al. | 285/319 |
| 2002/0079702 | A1 * | 6/2002 | Baumann et al. | 285/343 |

(Continued)

FOREIGN PATENT DOCUMENTS

EP 545410 A1 * 6/1993
TW 545543 8/2003

*Primary Examiner*—James M Hewitt
(74) *Attorney, Agent, or Firm*—J.C. Patents

(57) ABSTRACT

A fast-connecting joint for corrugated pipes includes a main body and an engaging member. The main body has a through hole for liquid to flow through, and an inner recessed annular wall provided with an annular slope close to one end of the main body. The engaging member possesses an outer annular wall, and plural flexible curved petals extending outward around one end of the outer annular wall and respectively having a projection on their outer surface. In assembly, the engaging member is inserted in the through hole of the main body, with the projections of the engaging member correspondingly fitted against the inner recessed annular wall. In use, a corrugated pipe can be quickly fastened with the fast-connecting joint tightly when it is inserted into the engaging member to keep its annular groove blocked by the curved petals.

8 Claims, 10 Drawing Sheets

U.S. PATENT DOCUMENTS

| | | | |
|---|---|---|---|
| 2003/0127855 A1* | 7/2003 | Heverly | 285/227 |
| 2003/0146622 A1* | 8/2003 | Youssefifar | 285/305 |
| 2003/0155767 A1* | 8/2003 | Hardie et al. | 285/319 |
| 2004/0080160 A1* | 4/2004 | Rief | 285/276 |
| 2004/0155463 A1* | 8/2004 | Moner | 285/322 |
| 2004/0178633 A1* | 9/2004 | Gehring et al. | 285/903 |
| 2006/0006651 A1* | 1/2006 | Watanabe | 285/903 |
| 2007/0013189 A1* | 1/2007 | Duquette et al. | 285/386 |
| 2007/0246936 A1* | 10/2007 | Jeltsch | 285/319 |
| 2008/0084064 A1* | 4/2008 | Kerin et al. | 285/319 |

* cited by examiner

FAST-CONNECTING JOINT FOR CORRUGATED PIPES

BACKGROUND OF THE INVENTION

1. Field of the Invention

This invention relates to a fast-connecting joint for corrugated pipes, particularly to one having its main body provided with an inner recessed annular wall, which is provided with an annular slope for mutually combined with projections of curved petals of an engaging member. When a corrugated pipe is quickly inserted in the engaging member and locked by the curved petals, it is strongly fastened with the fast-connecting joint, as the connection is to be tightened more and more if the corrugated pipe is continuously pulled outward by force.

2. Description of the Prior Art

As disclosed in a Taiwan patent No. 545543 "Connecting tube for corrugated pipes", a first conventional connecting tube for corrugated pipes is provided with a main body and a locking member mounted on an outer surface of the main body, enabling an engaging gap formed between the main body and the locking member at two ends of the main body so that one end of a corrugated pipe can correspondingly and tightly fits in the engaging gap, with the locking member kept fixedly in one of plural annular grooves of the corrugated pipe, finishing assembly of the corrugated pipe with the connecting tube.

However, it has disadvantages that the locking member is mounted around on the outer surface of the two end sections of main body, so the outer diameter of the main body is such enlarged to cost a little more. Moreover, if plural little corrugated pipes are to be inserted in a big one to be combined with the connecting tube, the locking member will become an obstacle for such an operation. Secondly, in order to keep the locking member effectively elastic, the locking member cannot be too thick to have elasticity; but, on the contrary, with an insufficient thickness, the locking member is apt to get broken.

A second conventional connecting tube for corrugated pipes, as shown in FIG. 1, includes a main body 1 provided with a through hole 10 for an engaging tubular member 11 to fit tightly therein for liquid to flow through. The engaging tubular member 11 is formed integrally, provided with a through hole 110, a plurality of petal-shaped locking members 111 formed continually around its rear portion, and a tapered end 112 extending outward from each locking members 111 for tightly fitting with an end of a corrugated pipe. As the main body 1 and the engaging tubular member 11 are independently made and have to be combined together by glue, the manufacturing cost is undoubtedly increased.

And, as shown in FIGS. 2~4, a third, a fourth and a fifth conventional connecting tubes for corrugated pipes commonly include a main body 2 provided with a through hole 20 and an engaging member 21 is integrally shaped together with and in the main body 2, with plural lengthwise gaps 22 formed both in the main body 2 and the engaging member 21. However, in constructing a building, when concrete is pumped upon a corrugated pipe jointed with the connecting tube 2; the damp concrete may permeate into the connecting tube 2 through the gap 22, possible to keep the wire inside the corrugated pipe badly affected by the humidity.

Moreover, a Taiwan patent of No. 093123761 titled "QUICK-TO-CONNECT JOINT FOR FLEXIBLE HOSES" disclosed by this inventor is mainly provided with a main body formed integrally, and plural elastic locking petals similar to those in this invention. But, it is still not so suitable for diverse environments and requirements.

SUMMARY OF THE INVENTION

The object of this invention is to offer a fast-connecting joint for corrugated pipes.

The main characteristics of the invention are described as below.

1. The fast-connecting joint for corrugated pipes includes a main body provided with a through hole and an inner recessed annular wall possessing an annular slope.

2. The fast-connecting joint for corrugated pipes also includes an engaging member that is provided with an outer annular wall and a plurality of flexible curved petals extending outward around one side of the outer annular wall and respectively having a projection on their outer surface, so that a corrugated pipe can be quickly and stably locked by the engaging member of the fast-connecting joint.

3. While a corrugated pipe is locked by the engaging member, it is to be tightened more and more with the fast-connecting joint if continuously pulled by any force, instead of being drawn off.

BRIEF DESCRIPTION OF DRAWINGS

This invention is better understood by referring to the accompanying drawings, wherein.

DETAILED DESCRIPTION OF THE PREFERRED EMBODIMENT

As shown in FIGS. 5~12, a first preferred embodiment of a fast-connecting joint for corrugated pipes in the present invention is composed of a main body 3 and an engaging member 4.

Figure 9:
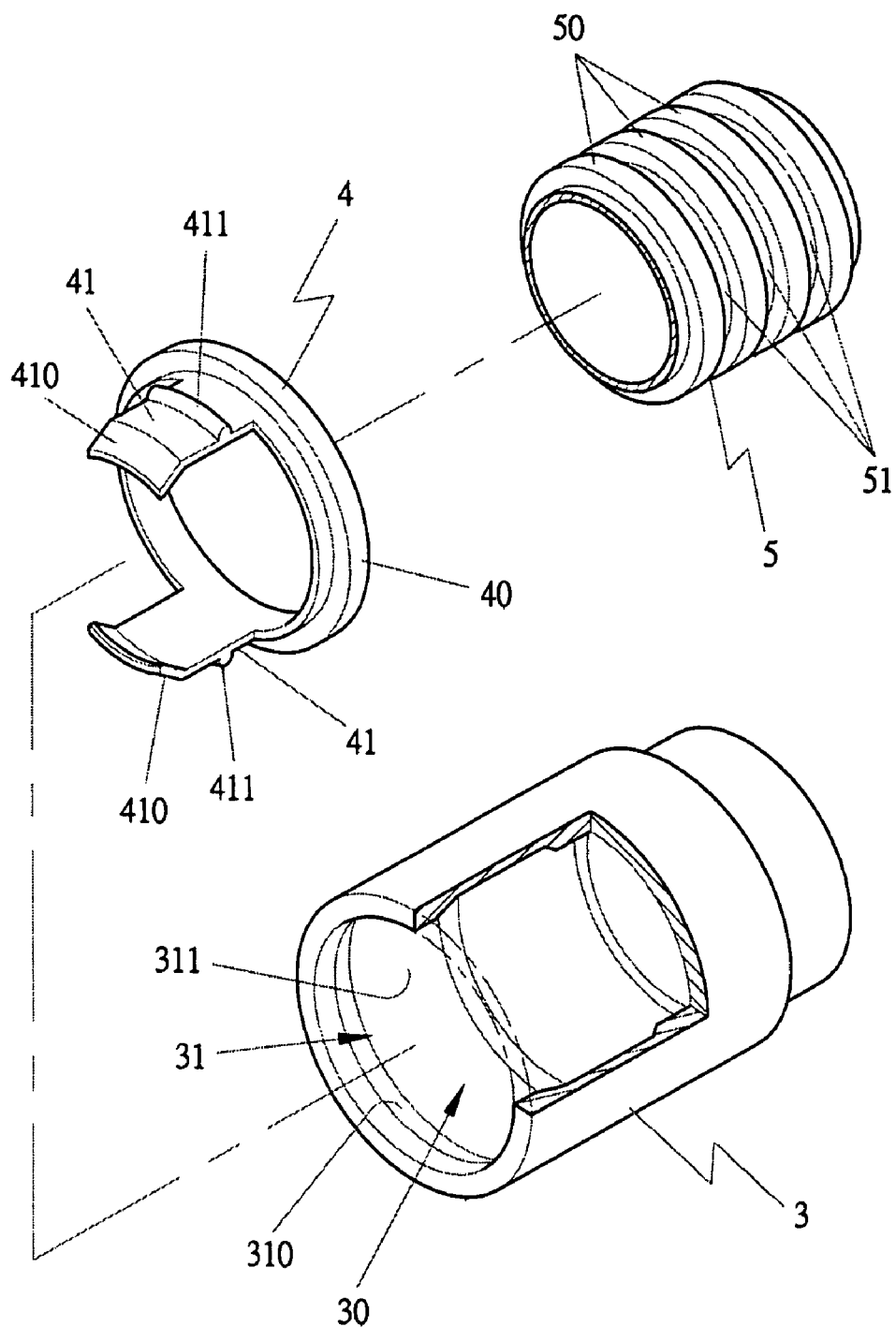
FIG. 9 is an exploded perspective view of the first preferred embodiment of a fast-connecting joint for corrugated pipes in the present invention.
Figure 12:
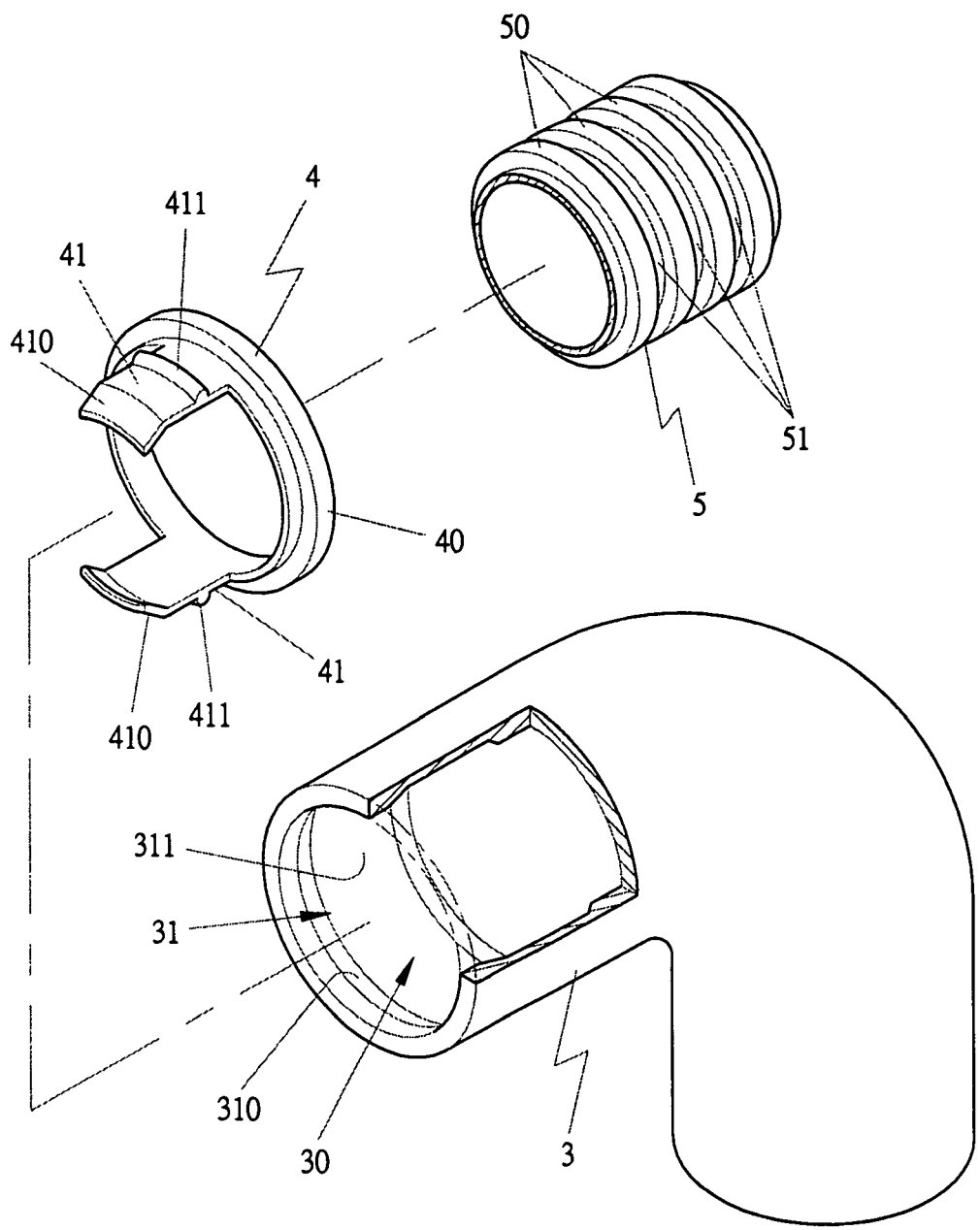
FIG. 12 is an exploded perspective view of a second preferred embodiment of a fast-connecting joint for corrugated pipes in the present invention.
Figure 13:
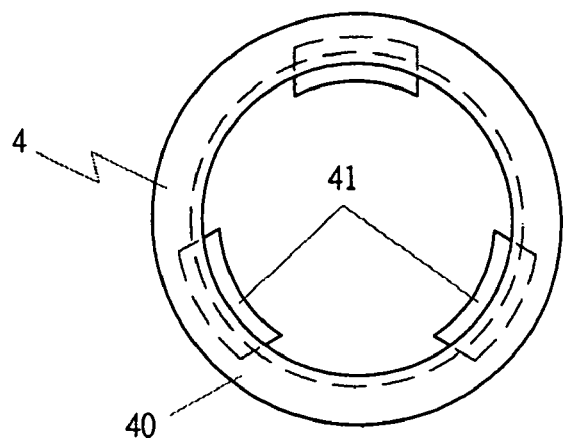
FIG. 13 is a front view of the engaging member of a third preferred embodiment of a fast-connecting joint for corrugated pipes in the present invention.
Figure 14:
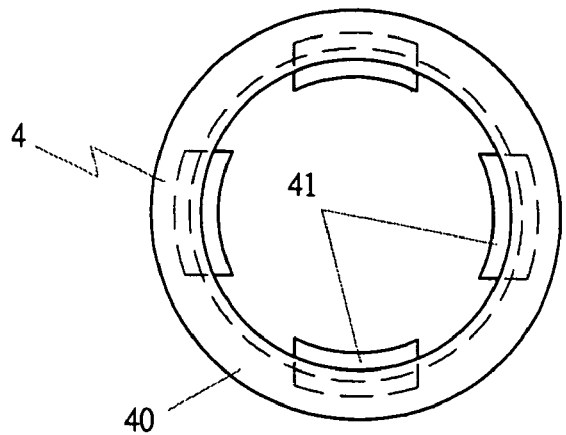
FIG. 14 is a front view of the engaging member of a fourth preferred embodiment of a fast-connecting joint for corrugated pipes in the present invention.
Figure 15:
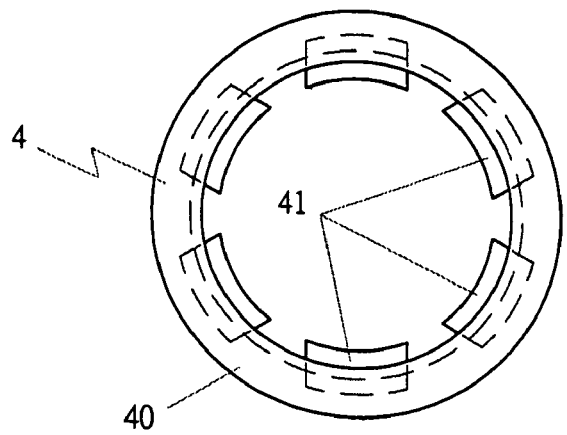
FIG. 15 is a front view of the engaging member of a fifth preferred embodiment of a fast-connecting joint for corrugated pipes in the present invention.

The main body 3 can be made into any shape, such as a straight tube shown in FIG. 9, a right-angular tube shown in FIG. 12 or a tube bent with diverse angles, a crossed one or a T-shaped one, provided with a through hole 30 for liquid to flow through, and an inner recessed annular wall 31 formed inside it. The inner recessed annular wall 31 includes an annular slope 310 and an annular surface 311, with the annular slope 310 located closer to one end of the main body 3.

The engaging member 4, as shown in FIGS. 6~9, is provided with an outer annular wall 40, and plural flexible curved petals 41 extending outward from one side of the annular surface 40 and equidistantly spaced apart. The engaging member 4 has two, three, four or six curved petals 41, as respectively shown in FIGS. 7, 13, 14 and 15. Of course, if a single curved petal 41 can work as well as plural ones do, it is not excluded from the invention. Each of the petals 41 is provided with a bent end 410 extending toward the central line of the engaging member 4, and an annular projection 411 positioned on its outer surface.

Figure 1:
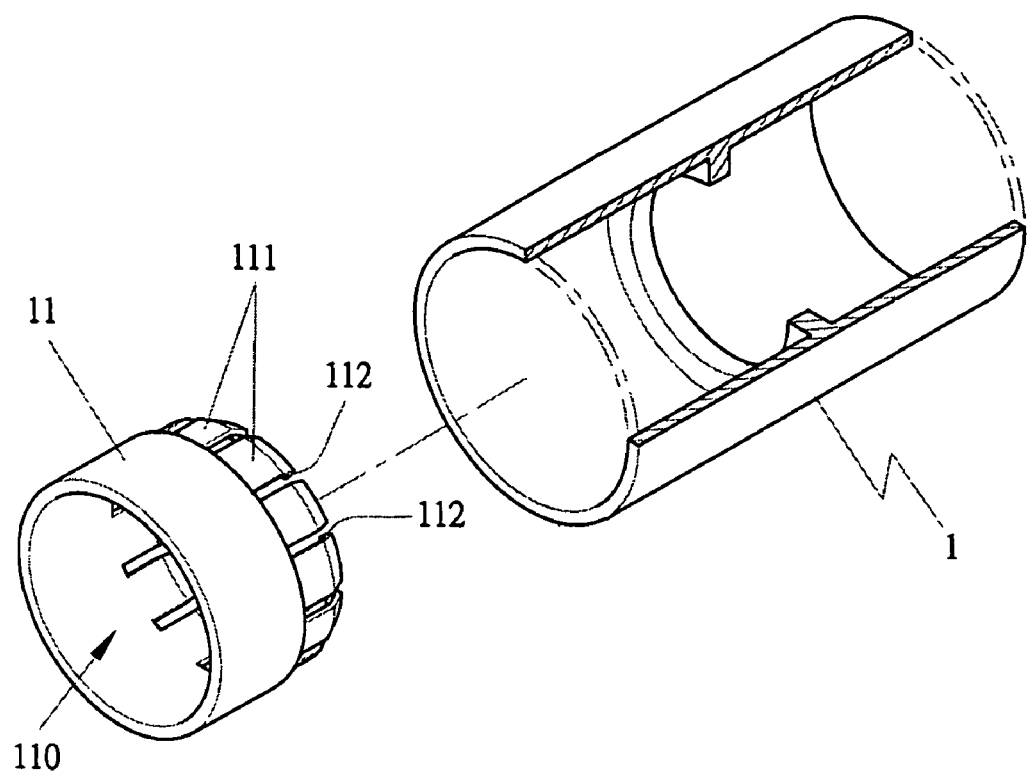
FIG. 1 is an exploded perspective view of a second conventional connecting tube for corrugated pipes.
Figure 2:
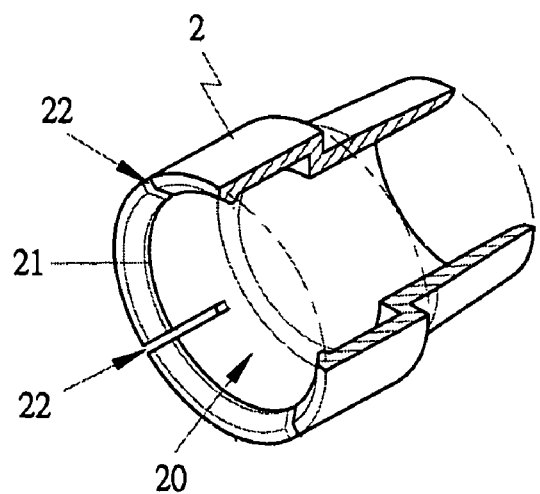
FIG. 2 is a partial perspective view of a third conventional connecting tube for corrugated pipes.
Figure 3:
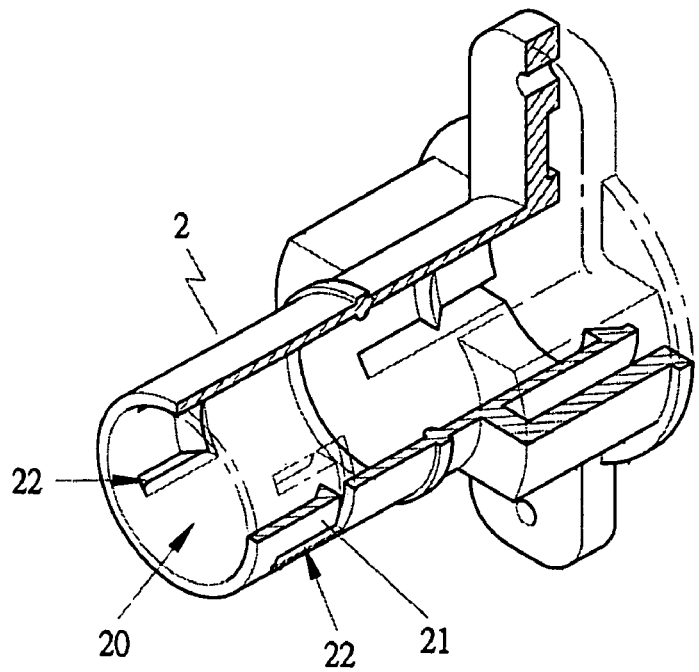
FIG. 3 is a partial perspective view of a fourth conventional connecting tube for corrugated pipes.
Figure 4:
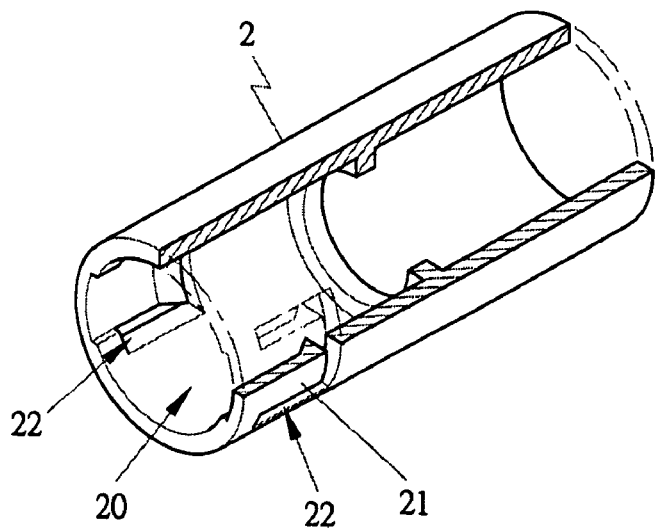
FIG. 4 is a partial perspective view of a fifth conventional connecting tube for corrugated pipes.
Figure 5:
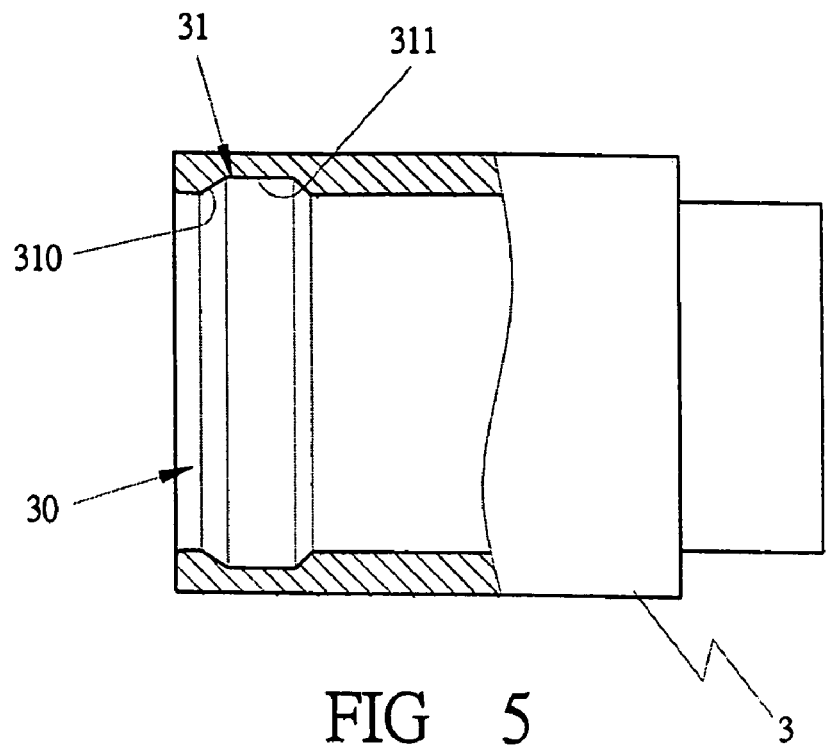
FIG. 5 is a side cross-sectional view of a first preferred embodiment of a fast-connecting joint for corrugated pipes in the present invention.
Figure 6:
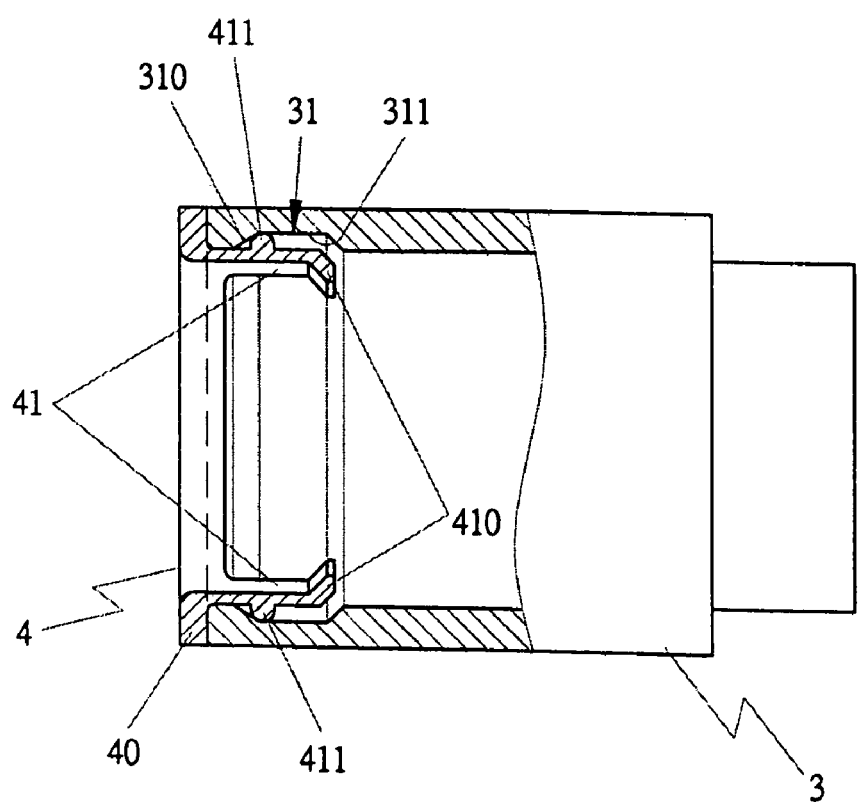
FIG. 6 is a side cross-sectional view of the first preferred embodiment of a fast-connecting joint for corrugated pipes in the present invention, showing assembly of a main body and an engaging member.
Figure 7:
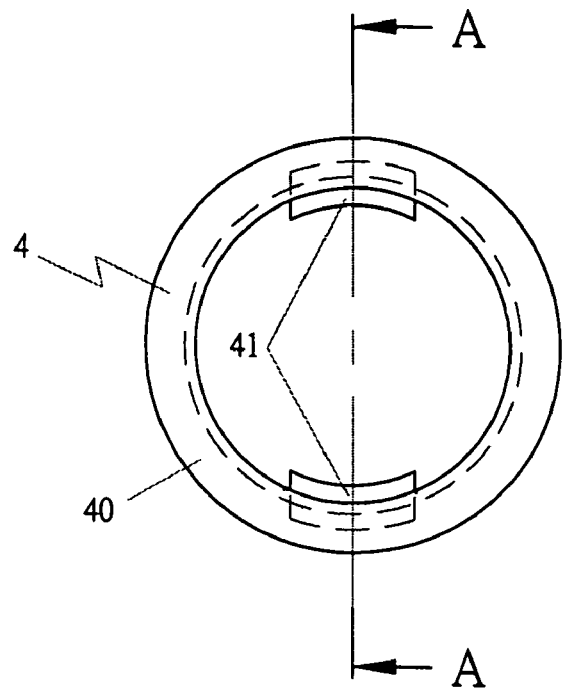
FIG. 7 is a front view of the engaging member of the first preferred embodiment of a fast-connecting joint for corrugated pipes in the present invention.
Figure 8:
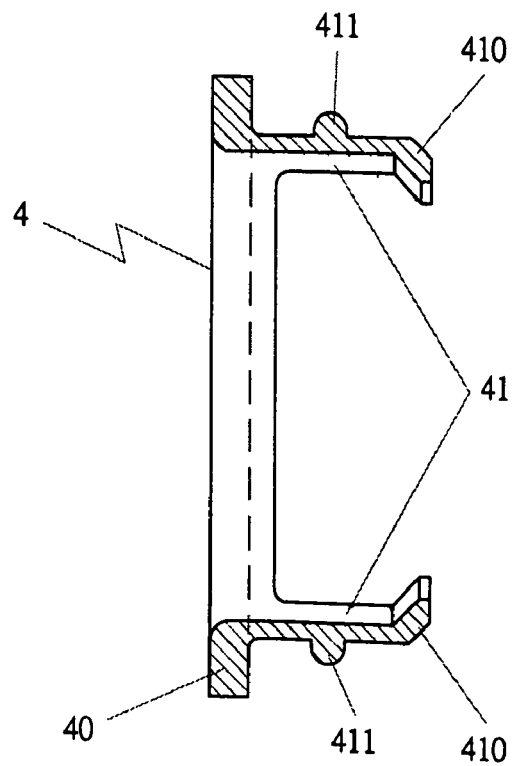
FIG. 8 is a cross-sectional view of an "A-A" line in FIG. 7.

In assembling, it needs just to insert the curved petals 41 of the engaging member 4 into the through hole 30 of the main body 3. That is, due to the shape of the bent portions 410, the curved petals 41 can be flexibly pushed into the inner recessed annular wall 31 of the main body 3, as shown in FIG. 6, with the outer annular wall 40 of the engaging member 4 contacting against an end of the main body 3, thus finishing the assembly of the fast-connecting joint.

Figure 10:
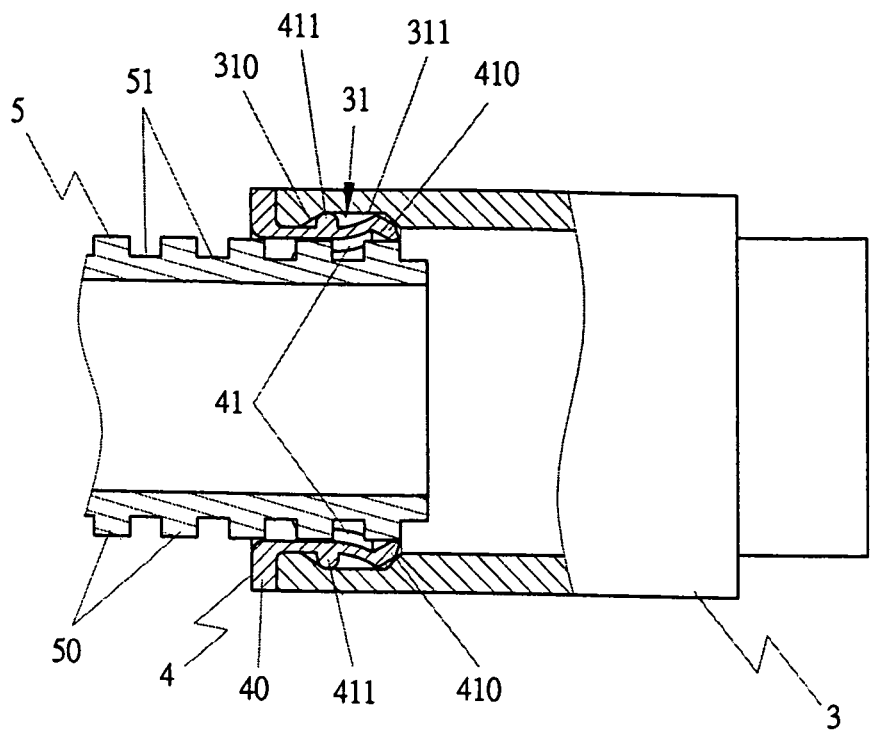
FIG. 10 is a side cross-sectional view of the first preferred embodiment of a fast-connecting joint for corrugated pipes in the present invention, showing it being jointed with a corrugated pipe.
Figure 16:
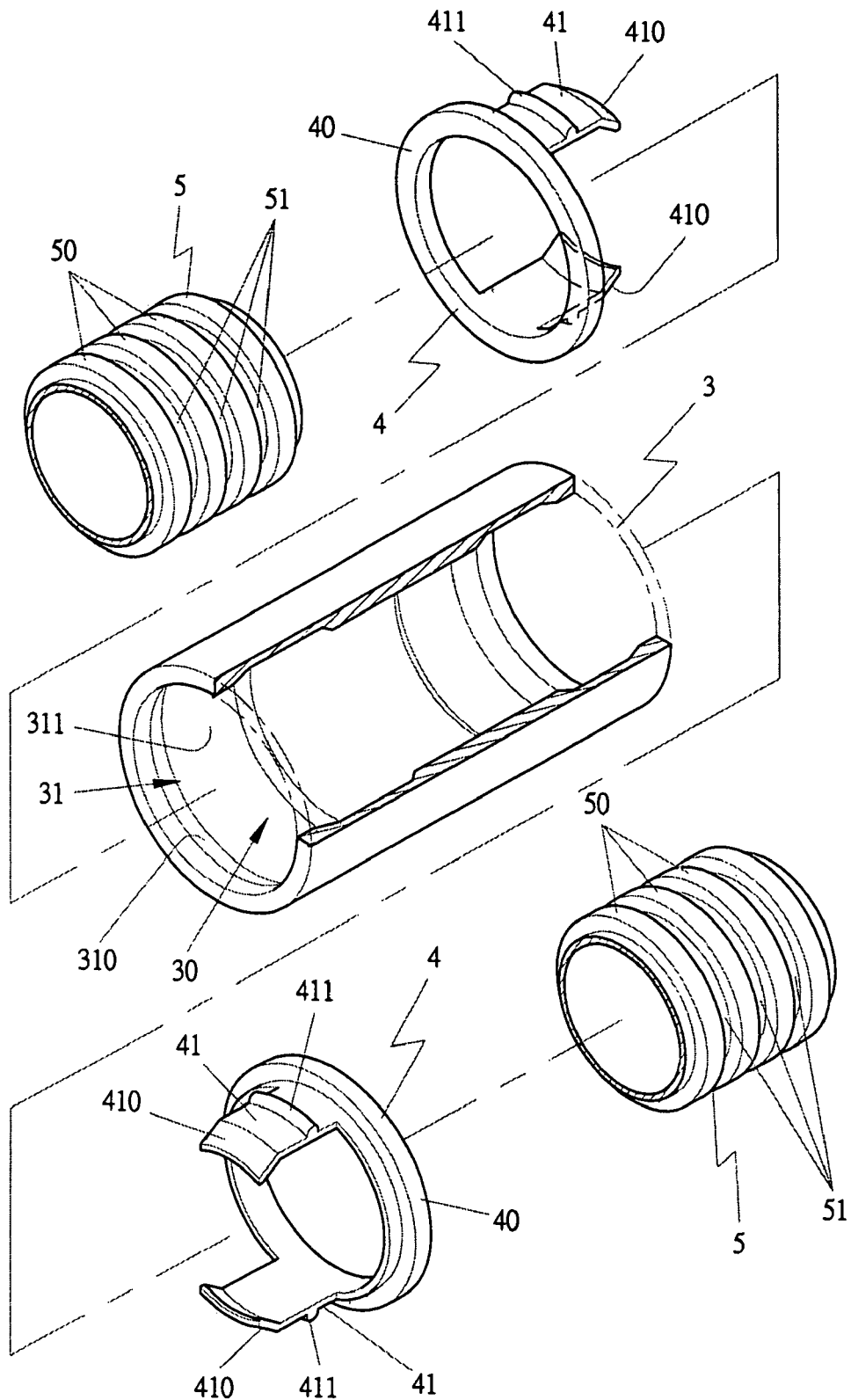
FIG. 16 is an exploded perspective view of a sixth preferred embodiment of a fast-connecting joint for corrugated pipes in the present invention.

In using, a user can intrude a corrugated pipe 5 into the main body 3 from the engaging member 4. The main body 3 can be accordingly assembled with one of two engaging members 4, as shown in FIG. 16. By the time, the curved petals 41 of the engaging member 4 are first to be squeezed by projected annular knots 50 of the corrugated pipe 5 to move toward the annular surface 311 of the inner recessed annular wall 31, as shown in FIG. 10; then, after being passed over by the projected annular knots 50, the curved petals 41 will elastically move back to their original position to lock in an annular groove 51 of the corrugated pipe 5, as shown in FIG. 11, keeping the corrugated pipe 5 unable to be pulled out unless breaking the fast-connecting joint.

Figure 11:
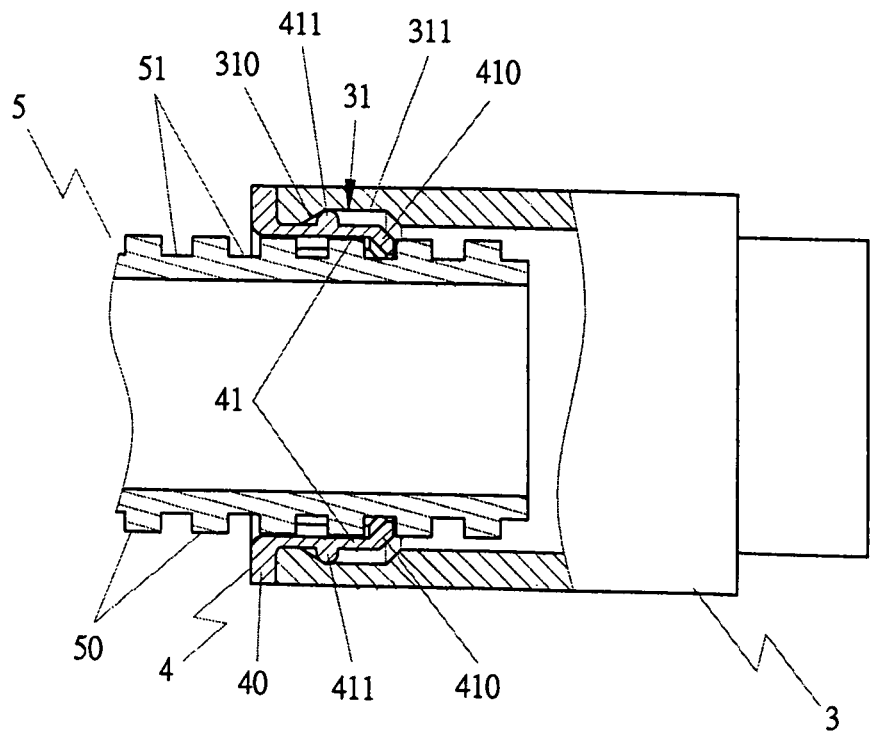
FIG. 11 is another side cross-sectional view of the first preferred embodiment of a fast-connecting joint for corrugated pipes in the present invention, showing it being jointed with a corrugated pipe.

Again, as shown in FIG. 11, if the corrugated pipe 5 having being locked by the curved petals 41 is pulled outward by force, it is to be tightened more and more with the curved petals 41 as the projections 411 of the curved petals 41 are more tightly blocked by the annular slope 310 of the main body 3 as long as it is kept on pulled. So, the corrugated pipe 5 cannot be pulled off the fast-connecting joint by any unintended force.

Figure 17:
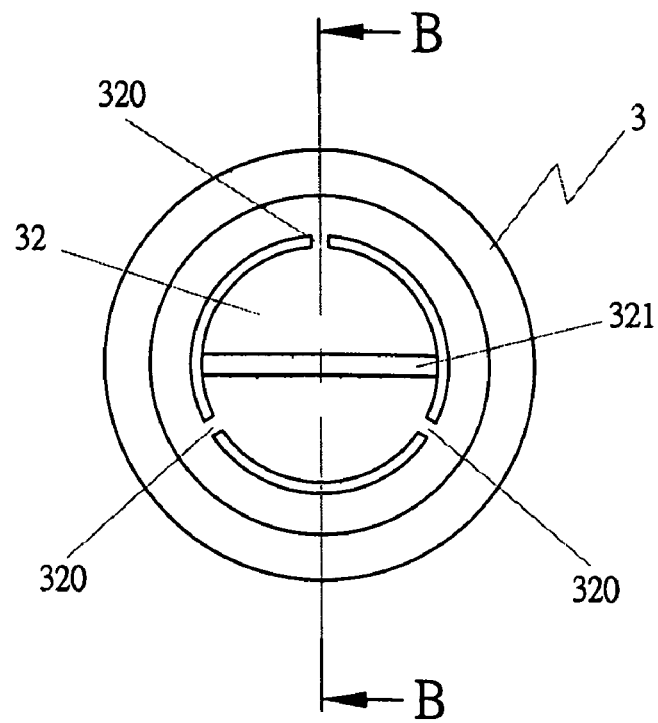
FIG. 17 is a front view of a seventh preferred embodiment of a fast-connecting joint for corrugated pipes in the present invention.
Figure 18:
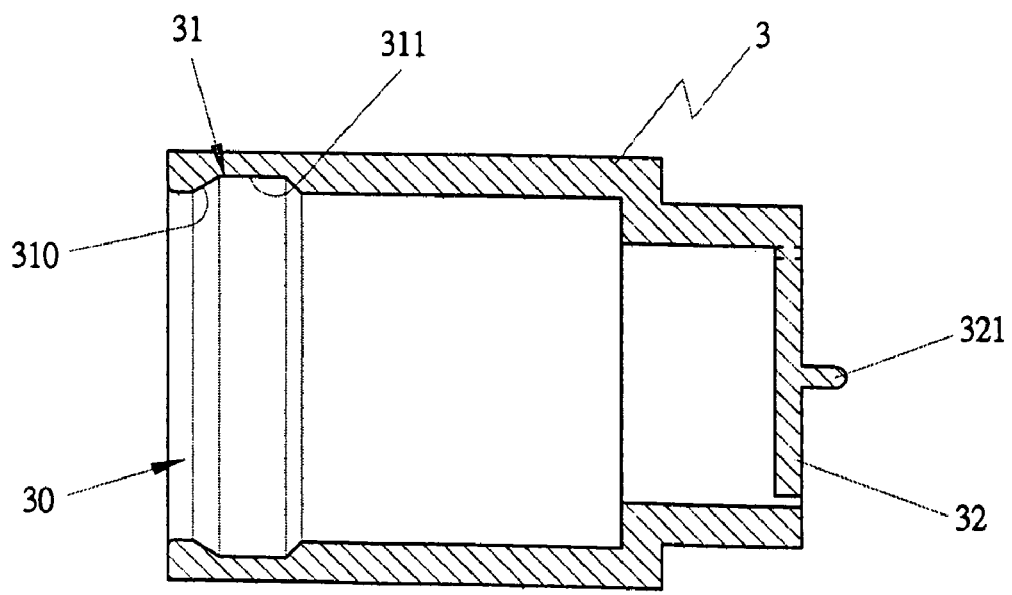
FIG. 18 is a cross-sectional view of a "B-B" line in FIG. 7.

In addition, as shown in FIGS. 17 and 18, a seventh preferred embodiment of a fast-connecting joint for corrugated pipes in the present invention has the main body 3 additionally provided with a sealing cover 32 integrally formed at one end with the through hole 30. The sealing cover 32 is provided with a plurality of ribs 320 connected to the inner; wall of the main body 3. With the sealing cover 32, concrete or other contaminants can be prevented from entering the fast-connecting joint when the fast-connecting joint in advance installed in a junction box is buried by concrete while a building is being constructed. Moreover, the sealing cover 32 is also provided with a pulling portion 321 formed on its outside for being pulled to draw the sealing cover 32 off the main body 3 after finishing pouring concrete, so as to enable the fast-connecting joint opened for wires to pass through.

While the preferred embodiment of the invention has been described above, it will be recognized and understood that various modifications may be made therein and the appended claims are intended to cover all such modifications that may fall within the spirit and scope of the invention.

What is claimed is:

1. A fast-connecting joint for corrugated pipes, said joint comprising:
    a main body provided with a through hole, an annular recess formed on a sidewall of the through hole; and
    an engaging member provided with a cylindrical sidewall defining a through hole, plural elastic curved petals being formed along the circumference of said cylindrical sidewall at a first end of said cylindrical sidewall and extending in the axial direction of said cylindrical sidewall, each of the petals having an inward bent portion formed at a distal end of said petal and a projection positioned on an outer surface of said petal;
    when in use, the engaging member is inserted into the through hole of the main body, and a corrugated pipe is inserted into the through hole of the engaging member; the corrugated pipe forces the elastic curved petals to extend outward, causing the projection of the petals to engage with the annular recess of the main body to prevent the engaging member from being separated from the main body; and the inward bent portion of the petals engages with corrugated outer surface of the corrugated pipe to restrict backward movement of the corrugated pipe relative to the engaging member.

2. The fast-connecting joint for corrugated pipes as claimed in claim 1, wherein said main body is provided with a sealing cover integrally formed together and connected with said main body by plural ribs, and a pulling member formed on an outer surface of said sealing cover.

3. The fast-connecting joint for corrugated pipes as claimed in claim 1, wherein the engaging member has an annular flange positioned at a second end of the cylindrical sidewall and extending outward radially.

4. The fast-connecting joint for corrugated pipes as claimed in claim 3, wherein the outer diameter of the annular flange has the same dimension as the outer diameter of the sidewall of the main body.

5. The fast-connecting joint for corrugated pipes as claimed in claim 1, wherein the projection extends on the outer surface of the petals along a circumference direction of the side wall of the engaging member.

6. The fast-connecting joint for corrugated pipes as claimed in claim 1, wherein there is no opening on the sidewall of the main body.

7. The fast-connecting joint for corrugated pipes as claimed in claim 1, wherein the annular recess comprises an annular flat surface parallel with inner surface of the sidewall of the main body and an annular slope, one edge of the annular slope connecting the annular flat surface, the other edge of the annular slope connecting the inner surface.

8. A fast-connecting joint for corrugated pipes, said joint comprising:
- a main body provided with a through hole, an annular recess formed on a sidewall of the through hole; and
- an engaging member provided with a cylindrical sidewall defining a through hole, one elastic curved petal being formed along the circumference of said cylindrical sidewall at a first end of said cylindrical sidewall and extending in the axial direction of said cylindrical sidewall, the petal having an inward bent portion formed at a distal end of said petal and a projection positioned on an outer surface of said petal;
- when in use, the engaging member is inserted into the through hole of the main body, and a corrugated pipe is inserted into the through hole of the engaging member; the corrugated pipe forces the elastic curved petals to extend outward, causing the projection of the petals to engage with the annular recess of the main body to prevent the engaging member from being separated from the main body; and the inward bent portion of the petals engages with corrugated outer surface of the corrugated pipe to restrict backward movement of the corrugated pipe relative to the engaging member.

* * * * *